United States Patent
Hall (10) Patent No.: US 11,893,277 B2
(45) Date of Patent: Feb. 6, 2024

(54) DATA STORAGE DEVICE MANAGING LOW ENDURANCE SEMICONDUCTOR MEMORY WRITE CACHE

(71) Applicant: Western Digital Technologies, Inc., San Jose, CA (US)

(72) Inventor: David R. Hall, Rochester, MN (US)

(73) Assignee: Western Digital Technologies, Inc., San Jose, CA (US)

(*) Notice: Subject to any disclaimer, the term of this patent is extended or adjusted under 35 U.S.C. 154(b) by 18 days.

(21) Appl. No.: 17/180,782

(22) Filed: Feb. 20, 2021

(65) Prior Publication Data
US 2022/0113906 A1 Apr. 14, 2022

Related U.S. Application Data

(60) Provisional application No. 63/091,495, filed on Oct. 14, 2020.

(51) Int. Cl.
*G06F 3/06* (2006.01)
*G06F 12/08* (2016.01)
(Continued)

(52) U.S. Cl.
CPC ............ *G06F 3/0659* (2013.01); *G06F 3/068* (2013.01); *G06F 3/0616* (2013.01);
(Continued)

(58) Field of Classification Search
CPC ...... G06F 3/0659; G06F 3/0625; G06F 3/068; G06F 3/0616; G06F 3/0674;
(Continued)

(56) References Cited

U.S. PATENT DOCUMENTS

| 6,789,163 | B2 | 9/2004 | Fox et al. |
| 7,800,856 | B1 * | 9/2010 | Bennett ............... G11B 19/041 |
| | | | 714/24 |

(Continued)

FOREIGN PATENT DOCUMENTS

| EP | 1755042 A2 * | 2/2007 | ........... G06F 12/084 |
| EP | 2735983 A1 * | 5/2014 | ........... G06F 16/172 |

OTHER PUBLICATIONS

C. C. Chou, J. Jung, A. L. N. Reddy, p. V. Gratz and D. Voigt, "vNVML: An Efficient User Space Library for Virtualizing and Sharing Non-Volatile Memories," 2019 35th Symposium on Mass Storage Systems and Technologies (MSST), 2019, pp. 103-115.*

(Continued)

*Primary Examiner* — Pierre Michel Bataille
(74) *Attorney, Agent, or Firm* — PATTERSON + SHERIDAN, LLP; Steven H. VerSteeg (57) ABSTRACT

A data storage device is disclosed comprising a head actuated over a disk, a first semiconductor memory (SM) having a first endurance, and a second SM having a second endurance lower than the first endurance. A write command is received from a host including write data. When a size of the write command is less than a threshold, the write data is stored in a first SM write cache in the first SM, and when the size of the write command is greater than the threshold, the write data is stored in a second SM write cache in the second SM.

19 Claims, 6 Drawing Sheets

(51) Int. Cl.
*G06F 12/0868* (2016.01)
*G11B 5/012* (2006.01)
(52) U.S. Cl.
CPC ......... *G06F 3/0625* (2013.01); *G06F 3/0674* (2013.01); *G06F 12/0868* (2013.01); *G11B 5/012* (2013.01); *G06F 2212/1032* (2013.01)
(58) Field of Classification Search
CPC ......... G06F 12/0868; G06F 2212/1032; G06F 3/06; G11B 5/012
See application file for complete search history.

(56) References Cited

U.S. PATENT DOCUMENTS

| | | | | |
|---|---|---|---|---|
| 8,307,162 | B2 | 11/2012 | Ryu et al. | |
| 8,578,100 | B1 | 11/2013 | Huynh et al. | |
| 8,639,672 | B2* | 1/2014 | Amit | G06F 3/0689 707/693 |
| 9,558,124 | B2* | 1/2017 | Moon | G06F 3/068 |
| 9,959,052 | B1 | 5/2018 | Xu et al. | |
| 2007/0033341 | A1* | 2/2007 | Hashimoto | G06F 12/0873 711/E12.019 |
| 2013/0242425 | A1 | 9/2013 | Zayas et al. | |
| 2013/0339624 | A1* | 12/2013 | Sugizaki | G06F 12/122 711/136 |
| 2014/0143219 | A1* | 5/2014 | Therrien | G06F 16/1756 707/695 |
| 2015/0113203 | A1* | 4/2015 | Dancho | G06F 3/0616 711/102 |
| 2015/0277805 | A1* | 10/2015 | Cheng | G06F 3/0604 711/154 |
| 2016/0117099 | A1* | 4/2016 | Prins | G06F 3/061 711/103 |
| 2016/0117252 | A1* | 4/2016 | Thangaraj | G06F 12/0873 711/118 |
| 2020/0401514 | A1* | 12/2020 | Liang | G11C 11/1659 |
| 2023/0143181 | A1* | 5/2023 | Tan | G06F 3/0656 711/103 |

OTHER PUBLICATIONS

Y. Liu, C. Zhou and X. Cheng, "Hybrid SSD with PCM," 2011 11th Annual Non-Volatile Memory Technology Symposium Proceeding, 2011, pp. 1-5.*
S. K. Lee, S. Yoo and S. Lee, "Reducing read latency in phase-change RAM-based main memory," 2011 IEEE 54th International Midwest Symposium on Circuits and Systems (MWSCAS), Seoul, Korea (South), 2011, pp. 1-4.*
S. Tanakamaru, M. Doi and K. Takeuchi, "NAND Flash Memory/ReRAM Hybrid Unified Solid-State-Storage Architecture," in IEEE Transactions on Circuits and Systems I: Regular Papers, vol. 61, No. 4, pp. 1119-1132, Apr. 2014.*
L. -P. Chang, "A Hybrid Approach to NAND-Flash-Based Solid-State Disks," in IEEE Transactions on Computers, vol. 59, No. 10, pp. 1337-1349, Oct. 2010.*
Li-Pin Chang, "Hybrid solid-state disks: Combining heterogeneous NAND flash in large SSDs," 2008 Asia and South Pacific Design Automation Conference, Seoul, Korea (South), 2008, pp. 428-433.*
R. Wang, Z. Chen, N. Xiao, M. Zhang and W. Dong, "Assimilating Cleaning Operations with Flash-Level Parallelism for NAND Flash-Based Devices," 2014 IEEE International Conference on Computer and Information Technology, Xi'an, China, 2014, pp. 212-219.*
D. Roberts, T. Kgil and T. Mudge, "Using non-volatile memory to save energy in servers," 2009 Design, Automation & Test in Europe Conference & Exhibition, Nice, France, 2009, pp. 743-748.*

\* cited by examiner

DATA STORAGE DEVICE MANAGING LOW ENDURANCE SEMICONDUCTOR MEMORY WRITE CACHE

CROSS REFERENCE TO RELATED APPLICATIONS

This application claims priority to U.S. Provisional Patent Application Ser. No. 63/091,495, filed on Oct. 14, 2020, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
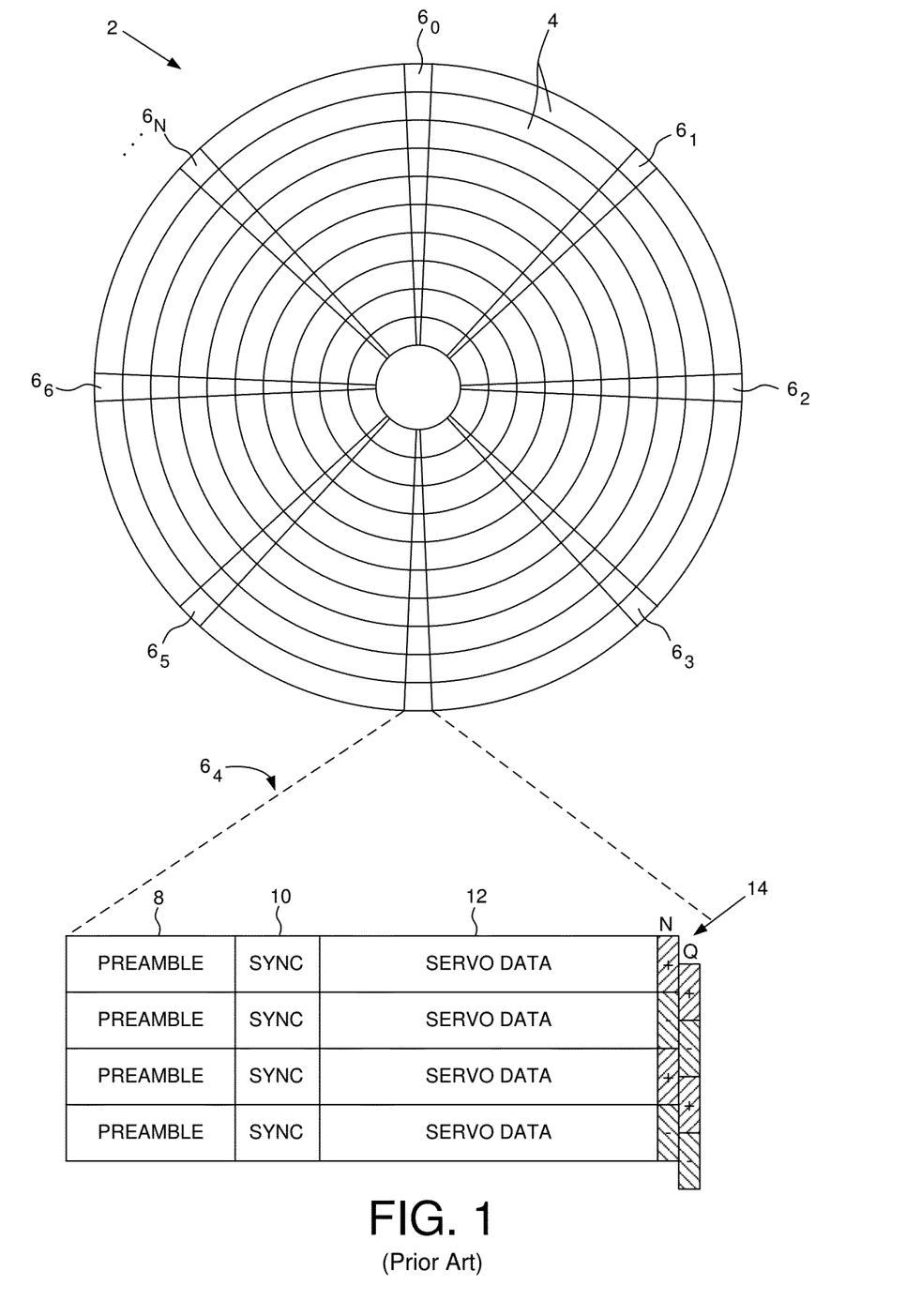
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B, 2C:
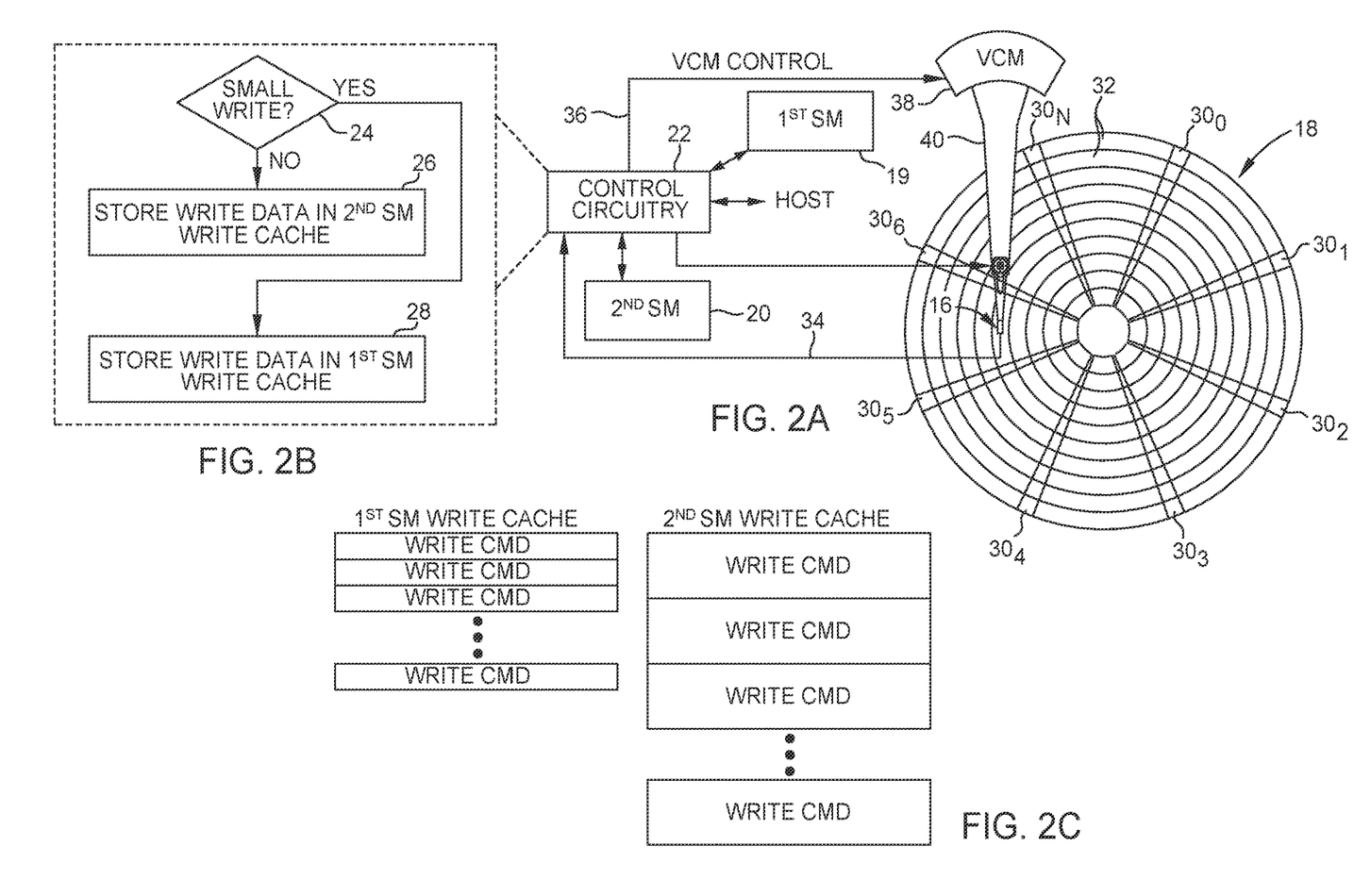
FIG. 2A shows a data storage device in the form of a disk drive according to an embodiment comprising control circuitry including a first semiconductor memory (SM) having a first endurance, a second SM having a second endurance lower than the first endurance, and a head actuated over a disk.
FIG. 2B is a flow diagram according to an embodiment wherein write commands less than a threshold are stored in a first SM write cache and above a threshold stored in a second SM write cache.
FIG. 2C shows a first SM write cache storing small write commands and a second SM write cache storing large write commands according to an embodiment.

FIG. 2A shows a data storage device in the form of a disk drive according to an embodiment comprising a head 16 actuated over a disk 18, a first semiconductor memory (SM) 19 having a first endurance, and a second SM 20 having a second endurance less than the first endurance. The disk drive further comprises control circuitry 22 configured to execute the flow diagram of FIG. 2B, wherein a write command including write data is received from a host. When a size of the write command is less than a threshold (block 24), the write data is stored in a first SM write cache in the first SM (block 26), and when the size of the write command is greater than the threshold, the write data is stored in a second SM write cache in the second SM (block 28).

In the embodiments described herein, any suitable SM may be employed where the second SM has a lower endurance than the first SM. For example, in one embodiment the first SM may comprise a suitable volatile semiconductor memory, such as Dynamic Random Access Memory (DRAM), or a suitable non-volatile semiconductor memory, such as Magnetic Random Access Memory (MRAM). The second SM may also comprise any suitable SM having a relatively lower endurance as compared to the first SM. In one embodiment, the second SM comprises one or more non-volatile SM (NVSM), such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory, TLC, QLC, etc., or any combination thereof), NOR memory, EEPROM, Ferroelectric Memory (FeRAM), Magneto-resistive RAM (MRAM), other discrete chips, or any combination thereof.

In the embodiment of FIG. 2A, the disk 18 comprises a plurality of servo sectors $30_0$-$30_N$ that define a plurality of servo tracks, wherein data tracks 32 are defined relative to the servo tracks at the same or different radial density. The control circuitry 22 processes a read signal 34 emanating from the head to demodulate the servo sectors and generate a position error signal (PES) representing an error between the actual position of the head and a target position relative to a target track. A servo control system in the control circuitry 22 filters the PES using a suitable compensation filter to generate a control signal 36 applied to a VCM 38 which rotates an actuator arm 40 about a pivot in order to actuate the head radially over the disk in a direction that reduces the PES. The head may also be servoed using a fine actuator, such as a piezoelectric (PZT) actuator, configured to actuate a suspension relative to the actuator arm 40, and/or configured to actuate the head relative to the suspension. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

FIG. 2C shows an embodiment wherein small write commands (having write data below a threshold) are stored in a first SM write cache in the first SM and large write commands (having write data above the threshold) are stored in a second SM write cache in the second SM. In one embodiment, caching the write data received from the host in a write cache increases the throughput performance of the data storage device by avoiding the access latency of the disk. In one embodiment, the cached write data may be flushed to the disk during low workloads and/or while executing other queued access commands received from the host in an execution order that helps minimize the mechanical access latency of the disk.

In one embodiment, the second SM 20 comprises a non-volatile SM (NVSM) written using an erase/write cycle wherein a block of the NVSM is first erased before at least a portion of the block can be rewritten with new data. Since each block may endure a specific limited number of erase/write cycles (i.e., limited endurance), a wear levelling algorithm is typically employed to "spread" the writes evenly over all of the blocks. The erase/write characteristic of the NVSM typically also means the addressing of the blocks is implemented using log-structured writes wherein logical block addresses (LBAs) are dynamically mapped to segments (e.g., pages) of each block. When an LBA is overwritten with new data, the LBA is dynamically mapped to a new block such that the old write data stored in the old block becomes invalid. This can lead to fragmented blocks storing both valid and invalid write data, wherein a garbage collection operation may be executed to relocate the valid data to new blocks so that the old blocks may be erased and rewritten. In one embodiment, utilizing the NVSM so as to reduce the amount of garbage collection can help increase the life of the NVSM by reducing the number of erase cycles associated with the garbage collection operations.

In one embodiment, the write data received with write commands from the host is cached in either a first SM write cache or a second SM write cache based on the size of the write data, thereby extending the life of the second SM by reducing the write frequency. In this embodiment, large write commands (having write data above a threshold) are cached in the second SM write cache such as shown in FIG. 2C in order to reduce the fragmentation of the second SM blocks. For example, the threshold may be set so that the write data of a large write command will fill at least one block in the second SM write cache. In this manner when the write data of a large write command is flushed to the disk, at least one entire block of the second SM storing the cached write data becomes invalid, thereby avoiding the need to garbage collect the block. In another embodiment described below, using the second SM write cache for large write commands improves the throughput of the data storage device while conserving the write cycles so as to extend the life of the second SM.

Figure 3:
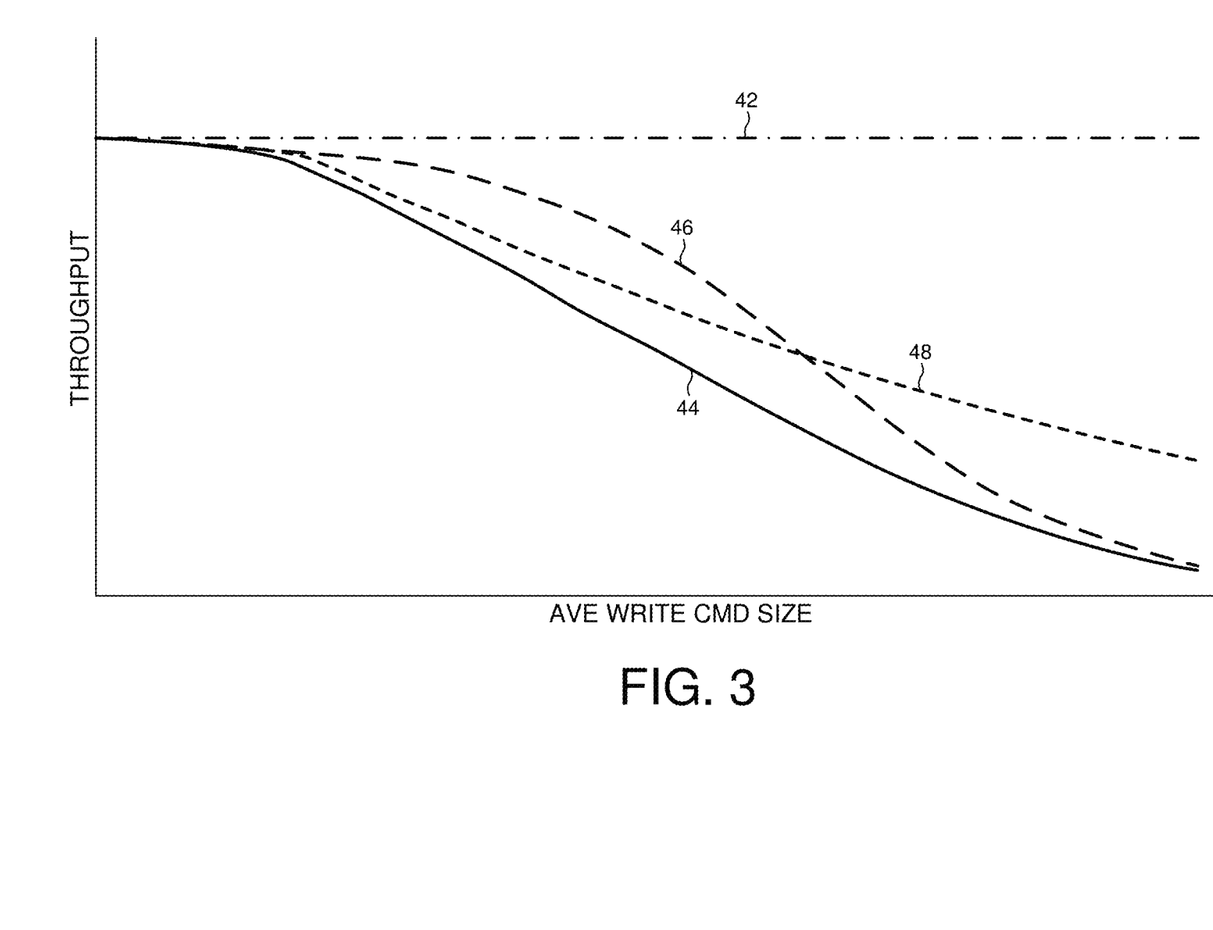
FIG. 3 shows four throughput graphs according to an embodiment illustrating a throughput performance of the data storage device relative to a queue depth of a command queue and a write transfer write of the disk.

In one embodiment, the throughput of the data storage device (in terms of the number of access commands serviced from the host per second) may be affected by the queue depth of a command queue (and corresponding size of the write cache) as well as the write transfer write of the disk. This is illustrated in an embodiment shown in FIG. 3, wherein the throughput graph 42 remains constant in the ideal case where the queue depth and write transfer rate are unconstrained. The throughput graph 44 represents the baseline case where both the queue depth and write transfer rate are constrained causing the throughput to decrease as the average size of the write commands increases. This is due to the queue depth decreasing since the number of cached write commands decreases as the write cache is filled to capacity. This is also due to the write time increasing as the size of the write commands increases for a given (constrained) transfer rate. The throughput graph 46 of FIG. 3 represents the case where the queue depth is unconstrained but the write transfer rate of the disk is constrained, and throughput graph 48 represents the case where the queue depth is constrained but the write transfer rate of the disk is unconstrained.

Figure 4:
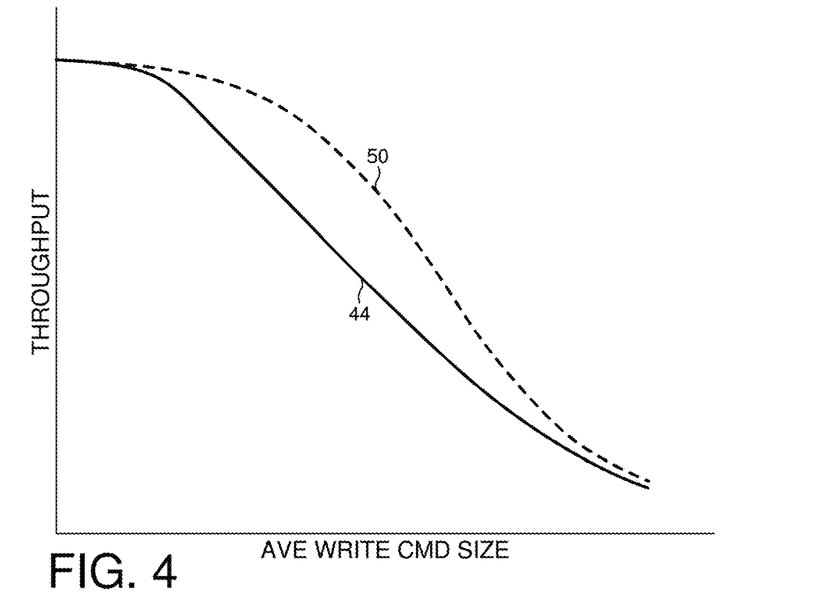
FIG. 4 shows two throughput graphs according to an embodiment illustrating a performance improvement provided by a second SM write cache relative to an average size of the write commands.
Figure 5:
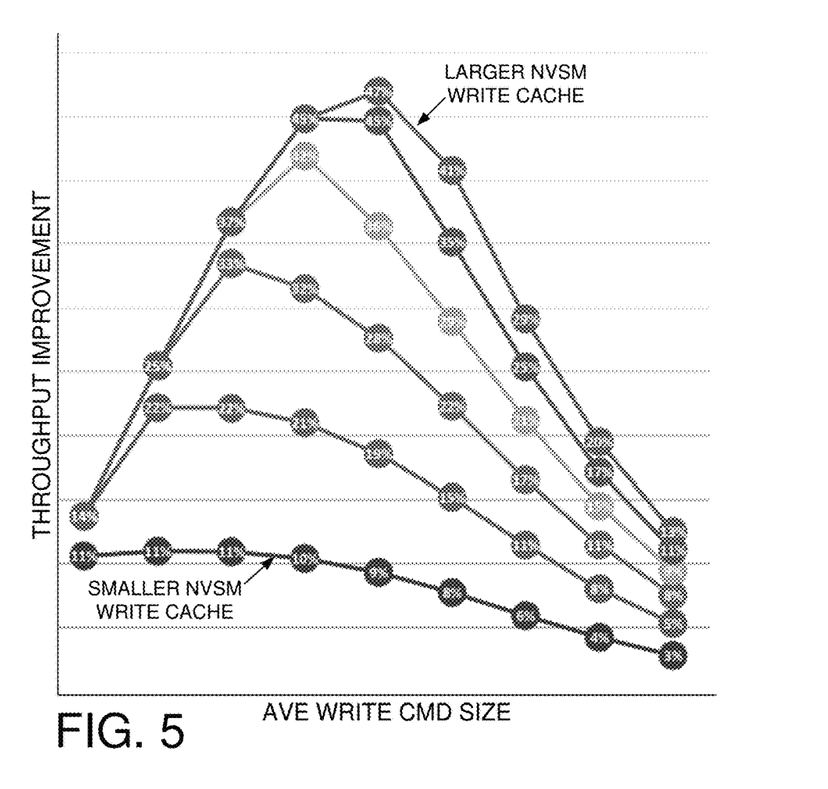
FIG. 5 shows multiple throughput graphs according to an embodiment illustrating the performance improvement for different sizes of the second SM write cache relative to an average size of the write commands.

In one embodiment, extending the write cache from the first SM into the second SM increases the queue depth by increasing the size of the write cache, thereby improving the throughput performance of the data storage device. FIG. 4 shows the baseline throughput graph 44 and an improved throughput graph 50 for a given size of the second SM write cache (in this example the write transfer rate of the disk is constrained). FIG. 5 shows multiple throughput graphs according to an embodiment illustrating the performance improvement for different sizes of the second SM write cache relative to an average size of the write commands. As the size of the second SM write cache increases, the performance improvement approaches the throughput graph 46 of FIG. 3 representing an unconstrained queue depth (with a constrained write transfer rate for the disk). FIG. 4 and FIG. 5 illustrate that the performance improvement provided by extending the write cache into the second SM diminishes when the average size of the write commands is relatively small as well as when the average size of the write commands is relatively large. Accordingly, in one embodiment when the average size of the write commands falls below a lower threshold or rises above an upper threshold, use of the second SM write cache may be throttled back (or disabled) in order to extend the life of the second SM.

In yet another embodiment, the life of the second SM may be extended by reducing the size of the second SM write cache in order to achieve a predetermined throughput performance relative to the average size of the write commands. That is, in one embodiment a minimum size of the second SM write cache may be selected based on the graphs shown in FIG. 5 that will achieve a predetermined throughput performance relative to the average size of the write commands. In one embodiment, the size of the second SM write cache may be adjusted dynamically as the average size of the write commands changes over time, or alternatively use of the second SM write cache may be throttled as the average size of the write commands changes over time.

In one embodiment, use of the second SM write cache may be throttled based on other factors that affect the throughput performance of the data storage device (in addition to or instead of the average size of the write commands). For example, in one embodiment use of the second SM write cache may be throttled based on the current queue depth of the command queue. When the queue depth is small, it means there is disproportionally more large write commands queued than small write commands, resulting in a corresponding decrease in throughput. Accordingly in one embodiment when the queue depth decreases, use of the second SM write cache may be increased in order to increase the queue depth and maintain the predetermined throughput.

Figure 6:
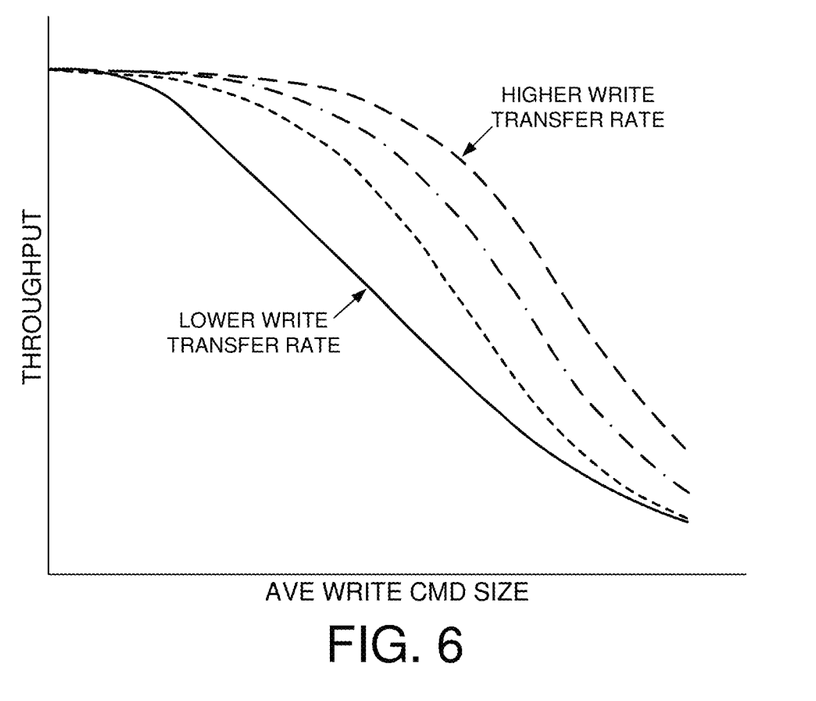
FIG. 6 shows multiple throughput graphs according to an embodiment illustrating the performance improvement for different write transfer rates relative to an average size of the write commands.

In another embodiment, use of the second SM may be throttled based on a write transfer rate of the disk. Referring again to FIG. 3, the throughput of the data storage device increases when the write transfer rate of the disk is unconstrained as illustrated by throughput graph 48. FIG. 6 shows multiple throughput graphs each corresponding to a different write transfer rate of the disk, wherein in one embodiment the control circuitry 22 may dynamically adjust the write transfer rate of the disk. For example, in one embodiment the control circuitry 22 may decrease the write transfer rate of the disk in order to reduce the power consumption of the data storage device. The write transfer rate of the disk may be adjusted in any suitable manner, such as by adjusting a rotation speed of the disk (where higher rotation speeds increase the write transfer rate). In another embodiment, the control circuitry 22 may adjust the write transfer rate by varying a number of active write channels to the disk(s). For example, in one embodiment the data storage device may comprise multiple disks with respective write/read heads configured to access the top/bottom disk surfaces. The write transfer rate of the disks may be increased by enabling the concurrent access of multiple disk surfaces, or decreased by throttling back the number of disk surfaces concurrently accessed. In one embodiment as the control circuitry 22 adjusts the write transfer rate of the disk(s), the use of the second SM write cache is throttled accordingly in order to maintain a predetermined throughput performance. For example, in one embodiment as the write transfer rate decreases the control circuitry 22 may increase use of the second SM write cache in order to maintain a predetermined throughput performance. Accordingly the control circuitry 22 may adjust various parameters of the data storage device in order to balance different objectives, such as balancing power consumption with conservation of the second SM 20.

Figure 7:
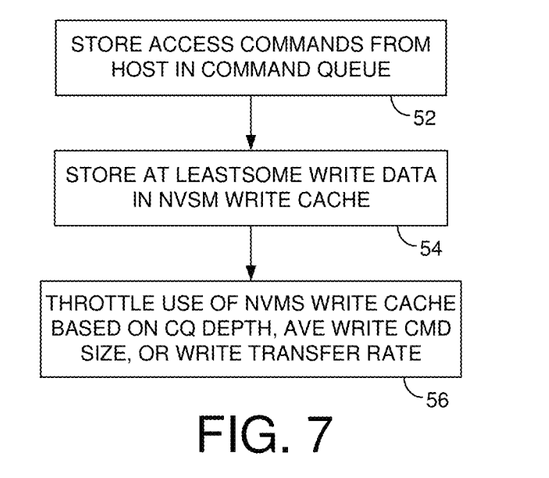
FIG. 7 is a flow diagram according to an embodiment wherein use of the second SM write cache is throttled based on at least one of a queue depth of a command queue, an average size of the write commands, or a write transfer rate of the disk.

FIG. 7 is a flow diagram according to an embodiment wherein a plurality of access commands are received from a host and stored in a command queue (block 52). At least some of the write data for the write commands is stored in the second SM write cache (block 54), and use of the second SM write cache is throttled based on at least one of the queue depth of the command queue, the average size of the write commands, or the write transfer rate of the disk. In one embodiment, the use of the second SM write cache is throttled in order to maintain a predetermined throughput performance as described above.

Figure 8:
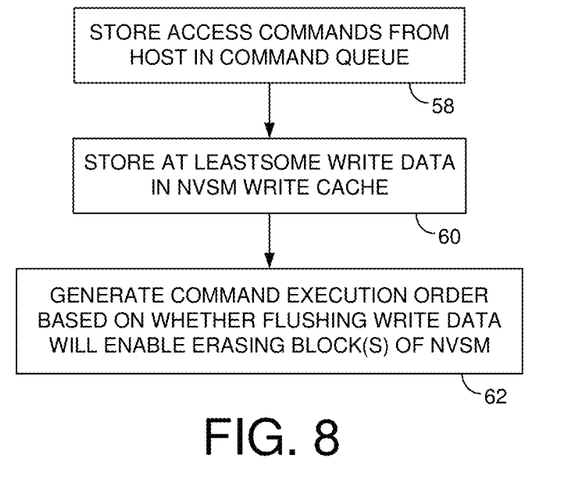
FIG. 8 is a flow diagram according to an embodiment wherein a command execution order is generated based on whether flushing write data from the second SM write cache to the disk will enable erasing one or more blocks in the second SM.

In one embodiment, the access commands received from the host and queued in the command queue are sorted into an execution order based on any suitable criteria, including to minimize an access latency of the disk in terms of seek latency of the head and rotation latency of the disk (rotational position optimization (RPO)). In one embodiment, certain access commands in the command queue may be prioritized by the sorting algorithm, for example, when the overall age of an access command exceeds a threshold. FIG. 8 is a flow diagram according to an embodiment wherein a plurality of access commands are received from a host and stored in a command queue (block 58). At least some of the write data for the write commands is stored in the second SM write cache (block 60), and the command execution order is generated based on whether flushing write data for a write command stored in the second SM write cache will enable erasing one or more blocks of the second SM (block 62). In one embodiment the cached write command may be prioritized (biased) by the sorting algorithm to increase the probability that the cached write command will be executed earlier so that the corresponding block(s) in the second SM 20 may be erased and re-used. For example, in one embodiment the cached write data may be stored in a fragmented second SM block comprising invalid data, wherein flushing the cached write data may invalidate the entire block so as to obviate the need to garbage collect the block. Accordingly the write command may be biased within the sorting algorithm to increase the likelihood that the cached write data will be flushed before the fragmented block in the second SM is garbage collected.

Figure 9:
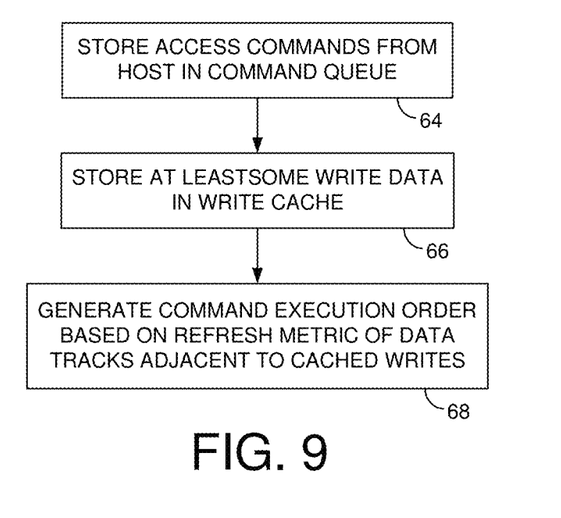
FIG. 9 is a flow diagram according to an embodiment wherein a command execution order is generated based on a refresh metric of victim data tracks adjacent the data tracks of a cached write command.

In one embodiment, the data written to the data tracks on the disk may degrade over time due to adjacent track interference when writing adjacent data tracks. In one embodiment, a refresh metric is maintained for each data track (or band of data tracks), and the data track(s) are refreshed (read and rewritten) when the refresh metric exceeds a refresh threshold. FIG. 9 is a flow diagram according to an embodiment wherein a plurality of access commands are received from a host and stored in a command queue (block 64). At least some of the write data for the write commands is stored in a write cache (block 66), and the execution order for the queued access commands is generated based on the refresh metric of victim data tracks adjacent the data tracks of the cached write commands (block 68). For example, flushing a cached write command may cause the refresh metric of an adjacent data track to exceed the refresh threshold triggering a refresh of the data track. Therefore the cached write command may be deprioritized by the sorting algorithm in order to defer flushing the cached write command. While the cached write command is deferred, there is the possibility the victim data track will be rewritten or refreshed while executing other queued access commands. That is, a victim data track may be rewritten by a queued access command, or a victim data track may be refreshed while executing the queued access commands, without needing to execute a dedicated refresh operation on the victim data track.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk;
a head actuated over the disk;
a first semiconductor memory (SM) having a first endurance, wherein the first SM is distinct from the disk;
a second SM having a second endurance lower than the first endurance, wherein the second SM is distinct from the disk and the first SM, and wherein the second endurance is based on a number of times the second SM is erased, and the second SM has a block size for garbage collection and erasure; and
control circuitry configured to:
receive a write command including write data from a host;
determine a size of write data of the write command;
when a determined size of the write command is less than a threshold that is based on the block size for garbage collection and erasure of the second SM, store, the write data in a first SM write cache in the first SM; and
when the determined size of the write command is greater than the threshold, store the write data in a second SM write cache in the second SM.

2. The data storage device as recited in claim 1, wherein the first SM comprises a volatile SM and the second SM comprises a non-volatile SM.

3. The data storage device as recited in claim 1, wherein the control circuitry is further configured to set the threshold to be additionally based on a predetermined throughput performance of the data storage device.

4. The data storage device as recited in claim 1, wherein the control circuitry is further configured to:
receive a plurality of write commands from the host, wherein each write command includes write data;
store the write commands in a command queue; and
set the threshold to be additionally based on a number of commands in the command queue.

5. The data storage device as recited in claim 4, wherein the control circuitry is further configured to increase the threshold when the number of commands in the command queue decreases.

6. The data storage device as recited in claim 1, wherein the control circuitry is further configured to:
receive a plurality of write commands from the host, wherein each write command includes write data; and
set the threshold to be additionally based on an average size of the write data received in a plurality of write commands received from the host.

7. The data storage device as recited in claim 1, wherein the control circuitry is further configured to set the threshold to be additionally based on a write transfer rate of the disk.

8. A data storage device comprising:
a disk;
a head actuated over the disk;
a semiconductor memory (SM), wherein the SM is distinct from the disk;
a non-volatile semiconductor memory (NVSM), wherein the NVSM is distinct from the disk and the SM; and
control circuitry configured to:
receive a plurality of write commands from a host, wherein each write command includes write data;
determine a size of write data of the write commands;
store, based upon the determining, the write commands in a command queue having a command queue depth;
store flushing, based upon the determining, at least some of the write data in a NVSM write cache; and
throttle use of the NVSM write cache based on at least one of the command queue depth, an average size of the write data, or a write transfer rate of the disk.

9. The data storage device as recited in claim 8, wherein the control circuitry is further configured to throttle use of the NVSM write cache based on a predetermined throughput performance of the data storage device.

10. The data storage device as recited in claim 8, wherein the control circuitry is further configured to increase use of the NVSM write cache when a number of commands in the command queue decreases.

11. The data storage device as recited in claim 8, wherein the control circuitry is further configured to increase use of the NVSM write cache when the average size of the write data exceeds a first threshold.

12. The data storage device as recited in claim 11, wherein the control circuitry is further configured to decrease use of the NVSM write cache when the average size of the write data exceeds a second threshold.

13. The data storage device as recited in claim 8, wherein the control circuitry is further configured to increase use of the NVSM write cache when the write transfer rate of the disk exceeds a threshold.

14. The data storage device as recited in claim 13, wherein the control circuitry is further configured to adjust the write transfer rate of the disk.

15. The data storage device as recited in claim 14, wherein the control circuitry is further configured to decrease the write transfer rate of the disk to reduce power consumption of the data storage device.

16. A data storage device comprising:
a disk;
a head actuated over the disk;
a semiconductor memory (SM), wherein the SM is distinct from the disk;
a non-volatile semiconductor (NVSM) comprising a plurality of blocks, wherein the NVSM is distinct from the disk and the SM; and
control circuitry configured to:
receive a plurality of write commands from a host, wherein each write command includes write data;
determine a size of write data of the write commands;
store, based upon the determining, at least some of the write data in a NVSM write cache in the NVSM; and
generate a command execution order for the write commands based on whether flushing the write data of each write command will enable erasing one or more blocks of the NVSM.

17. The data storage device as recited in claim 16, wherein the control circuitry is further configured to generate the command execution order so as to prioritize write commands that will enable erasing one or more blocks of the NVSM when the write data is flushed from the NVSM write cache to the disk.

18. A data storage device comprising:
a disk comprising a plurality of data tracks;
a head actuated over the disk;
a first semiconductor memory (SM) having a first endurance, wherein the first SM is distinct from the disk;
a second semiconductor memory (SM) a second endurance lower than the first endurance, wherein the second SM is distinct from the disk and the first SM; and
control circuitry configured to:
receive a plurality of write commands from a host, wherein each write command includes write data;
determine a size of write data of the write commands;
store, based upon the determining, at least some of the write data in a write cache; and
generate a command execution order for flushing cached write data to the disk, based on a refresh metric of victim data tracks adjacent to data tracks of the disk to which the cached write data are to be written.

19. The data storage device as recited in claim 18, wherein the control circuitry is further configured to defer flushing the write data from the write cache to the disk when flushing the write data would trigger a refresh of a victim data track.

* * * * *